March 31, 1953 S. B. COHN 2,633,493

BROAD-BAND WAVE GUIDE-TO-COAXIAL LINE JUNCTION

Filed April 2, 1946 2 SHEETS—SHEET 1

INVENTOR
SEYMOUR B. COHN
BY
William D. Hall
ATTORNEY

March 31, 1953 S. B. COHN 2,633,493

BROAD-BAND WAVE GUIDE-TO-COAXIAL LINE JUNCTION

Filed April 2, 1946 2 SHEETS—SHEET 2

INVENTOR

SEYMOUR B. COHN

BY

William D. Hall

ATTORNEY

Patented Mar. 31, 1953

2,633,493

UNITED STATES PATENT OFFICE 2,633,493

BROAD-BAND WAVE GUIDE-TO-COAXIAL LINE JUNCTION

Seymour B. Cohn, Cambridge, Mass., assignor to United States of America as represented by the Secretary of War Application April 2, 1946, Serial No. 658,938

4 Claims. (Cl. 178—44)

This invention relates generally to electrical apparatus and more particularly to a transforming junction for matching the impedances of a rectangular wave guide and a coaxial transmission line.

It is frequently desirable to utilize both hollow wave guides and coaxial transmission lines in different parts of the same electrical system in order to make available the inherent advantages which each of these two types of conductors possesses under certain conditions of operation. One common type of wave guide is the rectangular type, and the usual characteristic impedance of this type is higher than that of the common type of coaxial transmission line. In such a case it is necessary to provide an effective means of transferring power from one of these types of conductor to the other without producing reflections at the junction point with resulting large power losses.

It is therefore an object of the present invention to provide a transforming junction which will serve as an effective coupling means between a rectangular wave guide and a coaxial transmission line of lower characteristic impedance. It is a further object to design this junction so that it will provide effective coupling over a wide frequency range without causing excessive standing wave ratios. It is another object to obtain a good operation of the junction in the vicinity of the cutoff frequency of the wave guide and at the same time to maintain the physical size of the junction reasonably small.

Other objects, features and advantages of this invention will suggest themselves to those skilled in the art and will become apparent from the following description of the invention taken in connection with the accompanying drawings in which.

Figure 1:
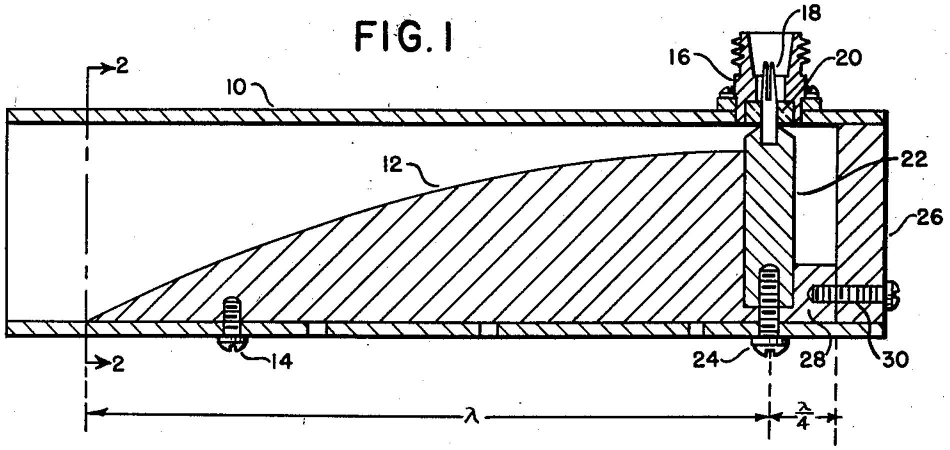
Fig. 1 is a longitudinal sectional view of one embodiment of the invention.

Reference is made now more particularly to Fig. 1, in which is shown a section of rectangular metallic wave guide 10, upon the lower inner surface of which is mounted a metallic section 12 forming a ridge in the central portion of this surface. The height of this ridge is varied approximately exponentially along its longitudinal dimension, but its width remains constant at some suitable value between ⅓ and ⅔ the width of the wave guide 10, as may be seen from the cross-sectional view of Fig. 2. The total length of the ridge section 12 is chosen to be one wavelength at some frequency within the desired pass band. The ridge may be formed either by indenting the lower surface of the wave guide 10 or by inserting a separate section into the wave guide, as in the embodiments shown in the figures. The section 12, in the case of the embodiment of Fig. 1, is fastened to the lower surface of the guide by a bolt 14 and/or solder or similar means. It should be understood that the terms "upper" and "lower" as used in the accompanying description refer to the position of the guide as shown in the figures and are not intended necessarily to indicate the position of the guide in actual use.

The coaxial line termination, which may be made of such dimensions as to fit the coaxial line to be employed, consists of an outer conductor 16, Fig. 1, attached to the upper surface of the guide 10 and an inner conductor 18 passing through the upper surface of the guide 10 and being insulated therefrom by a torus 20 of polystyrene or other suitable insulator. The end of conductor 18 is inserted in a conductor 22, which is within wave guide 10 and electrically connected to the lower surface of the guide by a bolt 24. The diameter of conductor 22 is the same as that of conductor 18 at the point of junction therewith and is increased by reason of a taper extending a short distance beyond the point of junction to a diameter which is a larger fraction of the width of the wave guide 10. Beyond the point of connection to the coaxial line the wave guide 10 is short-circuited by a metallic termination 26, the distance from the coaxial line to the short being ¼ wavelength at some frequency within the desired operating range. This terminal section of wave guide 10 has a ridge section 28 corresponding to the ridge 12 in the main part of the guide and of such dimensions that the characteristic impedance of this section is greater than that of the section immediately preceding the point of connection to the coaxial line. Ridge section 28 and termination 26 are connected together by a bolt 30. For good operation all metal-to-metal contact surfaces should be joined by solder or similar means to provide good electrical conduction.

Figure 2:
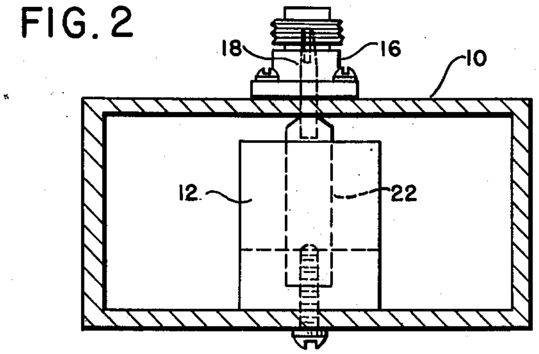
Fig. 2 is a cross-sectional view of the embodiment of Fig. 1 taken along the line 2—2.

Fig. 2 is a cross-sectional view of the guide taken along line 2—2 and looking toward the junction from the point at which the ridge section 12 begins, the various components being numbered to correspond to the reference numbers used in Fig. 1.

Figure 3:
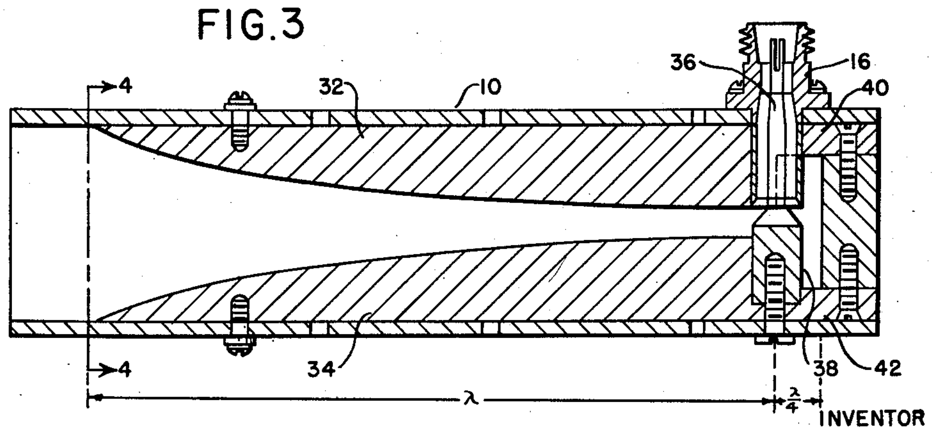
Fig. 3 is a longitudinal sectional view of a second embodiment of the invention.

Fig. 3 shows a second embodiment of the invention similar to the embodiment shown in Figs. 1 and 2 except that two symmetrical tapered ridge sections 32 and 34 have been inserted in the guide 10 on the upper and lower surfaces thereof, respectively. Central conductor 36 of the coaxial line extends to the middle portion of the guide between the ridge sections before being connected with conductor 38, which is tapered in a manner similar to conductor 22 of Fig. 1. The section of wave guide beyond the junction has two ridge sections 40 and 42 corresponding to the two symmetrical ridge sections 32 and 34 in the main guide, and the characteristic impedance of this terminal section, as in the case previously described, is made greater than that of the portion of the wave guide immediately preceding the junction.

Figure 4:
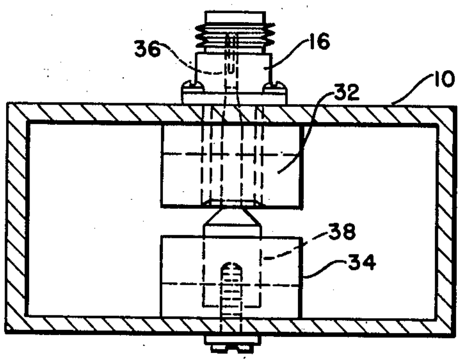
Fig. 4 is a cross-sectional view of the embodiment of Fig. 3 taken along the line 4—4.

Fig. 4 is a cross-sectional view of the embodiment shown in Fig. 3 taken along line 4—4 and looking toward the junction from the point at which the tapered ridge sections 32 and 34 begin. As may be seen from Fig. 4, the width of these ridge sections may be chosen to have the same ratio to the guide width as in the previous embodiment.

Figure 5:
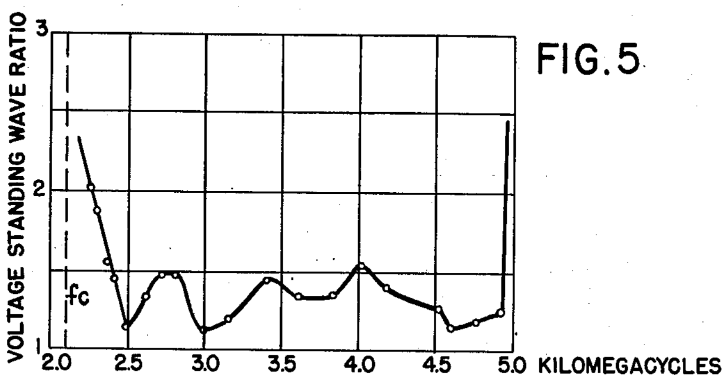
Fig. 5 is a curve showing a typical frequency response of the embodiment of Fig. 1.
Figure 6:
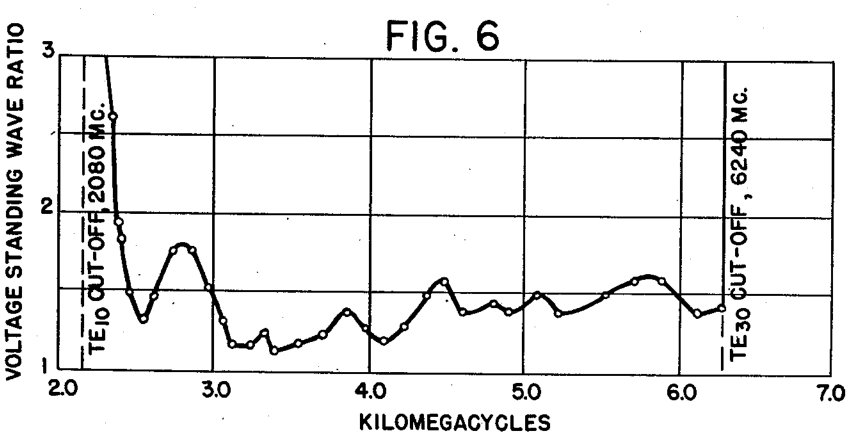
Fig. 6 is a curve showing a typical frequency response of the embodiment of Fig. 3.

The effectiveness of the junction may be measured in terms of the voltage standing wave ratio produced in the wave guide at various frequencies. Figs. 5 and 6 are typical curves showing the variation of voltage standing wave ratio throughout the frequency band for the two embodiments of the invention described above. It is to be understood that the values of frequency depend on the dimensions of the wave guide, and hence these curves are merely examples of those obtained using a particular size of guide with both types of junctions. Other dimensions would produce similar variations over other frequency ranges.

Wave guides, as is well known in the art, may operate in different modes, each corresponding to a different electromagnetic field pattern within the guide. Each of these modes is characterized by a cutoff frequency below which it cannot be propagated and which depends on the dimensions of the guide. At frequencies below the lowest of these cutoff frequencies the guide will conduct energy only with high attenuation. Its characteristic impedance becomes infinite at this lowest cutoff frequency and reactive below it for all modes of operation. The cutoff frequency of the section of wave guide containing the ridges is lower than that of the wave guide without the ridges, and the characteristic impedance of the ridge section remains finite at the cutoff frequency of the main guide, thus improving the overall response near this frequency. The use of the ridge makes possible the employment of a much shorter section to obtain a given change of impedance than if a tapered guide without the ridge were used. By making the length of the tapered ridge section proportionally longer with respect to the wavelength of the signals to be passed, the response near the lowest cutoff frequency may be improved. Hence it is necessary to reach a compromise between the quality of the response near the lowest cutoff frequency and the physical size of the transforming junction.

This type of junction is intended to transmit only the lowest or $TE_{10}$ mode, and hence it is desirable to exclude the transmission of higher modes. Because of symmetry the $TE_{20}$, which is the next higher mode, is excluded, and thus the single ridge junction of Figs. 1 and 2 is operable up to either the $TE_{30}$ or the $TE_{11}$ cutoff frequency, whichever happens to be the lower for a particular cross-sectional shape. By making the width of the ridge between ⅓ and ⅔ that of the wave guide itself, the $TE_{30}$ cutoff frequency of the ridge guide will be no lower than that for the wave guide without the ridge. The sharp increase in voltage standing wave ratio at the upper frequency limit, as shown in Fig. 5, is due to the $TE_{11}$ and/or $TM_{11}$ modes, whose cutoff frequency is near this point.

If an extension of the upper limit of the frequency band is desired while retaining the same guide dimensions, the embodiments of Figs. 3 and 4 may be utilized. The double tapered ridge prevents excitation of the $TE_{11}$ and $TM_{11}$ modes. This permits good performance up to approximately the cutoff frequency of the $TE_{30}$ mode, as shown by the extended frequency band represented by the response curve of Fig. 6.

The purpose of the section of short-circuited wave guide, which has a higher characteristic impedance than the coaxial line due to the decreased height of the ridge or ridges therein, is to increase further the operating range of each of the two embodiments described.

The tapered increase in the diameter of the conductor connected to the inner conductor of the coaxial line in the space between the ridges in the wave guide or between the ridge and the upper surface of the wave guide serves to reduce the effective inductance of this conductor. This results in a lower standing wave ratio over the operating frequency range of the junction. The optimum diameter for the coaxial line inner conductor within the wave guide is about 0.15 times the width of the guide.

While there have been described what are at present considered to be the preferred embodiments of this invention, it will be obvious to those skilled in the art that various changes and modifications may be made therein without departing from the scope of the invention.

The invention claimed is:

1. In combination with a rectangular wave guide and a coaxial radio-frequency transmission line, a first section of wave guide communicating with both said rectangular wave guide and said coaxial line and having a ridge section whose base extends longitudinally along the inner surface of one wall thereof, said ridge having a constant base width less than the width of said first section of wave guide and a height varying approximately exponentially from zero at the point of junction with said rectangular wave guide to a maximum at the point of junction with said coaxial line, the maximum height of said ridge being of such a value that the impedance of said first section of wave guide at said point of junction with said coaxial line is substantially equal to the characteristic impedance of said coaxial line, the central conductor of said coaxial line being connected to said one wall of said first section of wave guide adjacent to said ridge section base and passing through and insulated from the opposite wall thereof opposite said ridge section, the outer conductor of said coaxial line being connected to said opposite wall; and a second section of wave guide forming an extension of said first section of wave guide beyond the point of junction thereof with said coaxial line and having a similarly based internal longitudinal ridge of such height that the characteristic impedance of said second section of wave guide at said point of junction with said coaxial line is substantially higher than that of said coaxial line.

2. In combination with a rectangular wave guide and a coaxial radio-frequency transmission line, a first section of wave guide communicating with both said rectangular wave guide and said coaxial line and having two ridge sections extending longitudinally along the inner surfaces of two opposite walls thereof, each of said ridges having a constant width less than the width of said first section of wave guide and a height varying approximately exponentially from zero at the point of junction with said rectangular wave guide to a maximum at the point of junction with said coaxial line, the maximum height of each of said ridges being of such a value that the impedance of said first section of wave guide at said point of junction is substantially equal to the characteristic impedance of said coaxial line, the central and outer conductors of said coaxial line being connected respectively to said two walls of said first section of wave guide adjacent to said two ridge sections, said central conductor of said coaxial line passing through said first section of wave guide and having an increased diameter within said section; and a second section of wave guide forming an extension of said first section of wave guide beyond the point of junction thereof with said coaxial line and having similar internal longitudinal ridges of such height that the characteristic impedance of said second section of wave guide at said point of junction with said coaxial line is substantially higher than that of said coaxial line.

3. In combination with a rectangular wave guide and a coaxial radio-frequency transmission line, a first section of wave guide communicating with both said rectangular wave guide and said coaxial line and having at least one ridge section extending longitudinally along the inner surface of one wall thereof, said ridge having a constant width less than the width of said first section of wave guide and a height varying approximately exponentially from zero at the point of junction with said rectangular wave guide to a maximum at the point of junction with said coaxial line, the maximum height of said ridge being of such a value that the impedance of said first section of wave guide at said point of junction with said coaxial line is substantially equal to the characteristic impedance of said coaxial line, the central and outer conductors of said coaxial line being connected respectively to opposite walls of said first section of wave guide, said central conductor of said coaxial line passing through said first section of wave guide and having an increased diameter within said section; and a second section of wave guide forming an extension of said first section of wave guide beyond the point of junction thereof with said coaxial line and having at least one similar internal longitudinal ridge of such height that the characteristic impedance of said second section of wave guide at said point of junction with said coaxial line is substantially higher than that of said coaxial line.

4. In combination with a rectangular wave guide and a coaxial radio-frequency transmission line, a first section of wave guide having at least one longitudinal ridge on its inner surface and forming an electrical junction between said rectangular wave guide and said coaxial line, said ridge being tapered in size so as to match the impedance of said rectangular wave guide to that of said coaxial line, and a second section of wave guide forming an extension of said first section of wave guide beyond the point of junction thereof with said coaxial line and having at least one similarly located longitudinal ridge of such size that said second section of wave guide presents a characteristic impedance greater than that of said coaxial line.

SEYMOUR B. COHN.

REFERENCES CITED

The following references are of record in the file of this patent:

UNITED STATES PATENTS

| Number | Name | Date |
| --- | --- | --- |
| 2,207,845 | Wolff | July 16, 1940 |
| 2,496,643 | Smith | Feb. 7, 1950 |
| 2,540,839 | Southworth | Feb. 6, 1951 |